United States Patent [19]

Schmidt et al.

[11] 4,137,379
[45] Jan. 30, 1979

[54] STORAGE BATTERY WITH SEPARATOR OF DUMBBELL-SHAPED FIBERS

[75] Inventors: Klaus Schmidt, Hirschberg; Harald Hoffmann, Mannheim; Erich Fahrback, Weinheim, all of Germany

[73] Assignee: Firma Carl Freudenberg, Weinheim, Germany

[21] Appl. No.: 788,869

[22] Filed: Apr. 19, 1977

[30] Foreign Application Priority Data

Apr. 28, 1976 [DE] Fed. Rep. of Germany ....... 2618623

[51] Int. Cl.$^2$ ............................................. H01M 2/16
[52] U.S. Cl. .................................................... 429/254
[58] Field of Search .................. 429/163, 247–255; 204/296; 156/62.4, 167; 264/22, 24, 26; 428/399

[56] References Cited

U.S. PATENT DOCUMENTS

| | | | |
|---|---|---|---|
| 2,669,599 | 2/1954 | Clark | 429/254 X |
| 3,422,176 | 1/1969 | Jamison | 428/399 X |
| 3,676,540 | 7/1972 | Story et al. | 428/399 X |
| 3,730,777 | 5/1973 | Krey | 429/254 X |
| 3,779,682 | 12/1973 | Huskey | 264/22 X |
| 3,811,957 | 5/1974 | Buntin | 429/254 X |
| 3,875,270 | 4/1975 | Haefner et al. | 429/254 X |
| 3,947,537 | 3/1976 | Buntin et al. | 429/254 X |
| 3,982,863 | 9/1976 | Latham et al. | 264/22 X |

*Primary Examiner*—Charles F. LeFevour
*Attorney, Agent, or Firm*—Sprung, Felfe, Horn, Lynch & Kramer

[57] ABSTRACT

In a storage battery comprising a housing, a plurality of plates within said housing, an electrolyte within said housing about said plates, and a non-woven fabric separator between adjacent plates, the improvement which comprises employing as said separator a compressed web of synthetic fibers deposited in random arrangement and having an essentially dumbbell-shaped profile. Preferably the fibers comprise polystyrene, polyolefin or polycarbonate and have a maximum diameter of about 1 to 10 μm, and the web has a thickness of about 0.05 to 0.3 mm, a weight of about 20 to 100 g/m$^2$, a pore volume of about 50 to 90% and an average pore size from about 0.5 to 15 μm.

3 Claims, No Drawings

STORAGE BATTERY WITH SEPARATOR OF DUMBBELL-SHAPED FIBERS

BACKGROUND

The invention concerns a microporous separator for electrical accumulators or storage batteries.

An accumulator consists of two electrodes which are immersed in an electrolyte liquid and which have an opposite electrical charge. If the accumulator is electrically charged or discharged, a chemical process takes place at the electrodes. This is accompanied by a swelling and shrinking, respectively, of the electrodes. To prevent a short circuit from occurring between the electrodes due to dendritic crystal formation after a long period of operation, for example, separators are generally disposed between the electrodes (plates).

Separators of this kind must satisfy a number of requirements. On the one hand, they must assure that any direct flow of electrons between the oppositely charged plates is effectively prevented. On the other hand, such a separator must assure a largely unhampered flow of ions between the plates. Consequently, electrically non-conductive, electrolyte-resistant materials having a high volume of open pores of the smallest possible pore radius are particularly suitable for the manufacture of such separators.

It is known to manufacture a microporous separator from a polymeric substance in a basically solid form, a salt or other substance of finely granular structure being incorporated into the polymeric material, generally in a first production procedure, and then being removed again by physical or chemical methods, so that a fine-structured polymer matrix remains. Such separators have become known on a basis of polyvinyl chloride and on a basis of rubber. These separators, however, suffer from a number of disadvantages.

Firstly, it is found that the known separator materials of this kind have a certain brittleness and fragility which limit their ability to withstand handling and working. Separator materials based on polyvinyl chloride have poor resistance to heat, and also an undesirable liberation of chlorine in various forms is frequently produced by chemical influences. Rubber separators, on the other hand, have the disadvantage that they have poor resistance to oxidation and aging.

THE INVENTION

The invention is addressed to the problem of developing a microporous separator material which, though having good electrical properties, will void the above-described disadvantages and will have great uniformity in its mechanical characteristics.

This problem is solved by a microporous separator consisting of synthetic fibers of varying length laid down in random arrangement, the cross section of said fibers departing from a round profile and having an essentially dumbbell-shaped profile, and the said randomly laid fibers being compressed and, in some cases, laminated to a coarsely porous support material.

In one special embodiment, the fibers of the essentially dumbbell-shaped profile have a maximum width of about 0.05 to 20 $\mu$m, and preferably a maximum width of about 1 to 10 $\mu$m. Particularly good properties can be achieved if the fibers of the essentially dumbbell-shaped profile comprise polystyrene, polyolefin or polycarbonate.

The manufacture of a starting material for the formation of the microporous separator can be accomplished by the following method, for example:

The polymer is dissolved in a highly volatile solvent and sprayed onto a suitable support by the use of an electrodynamically operating spraying system. The solvent evaporates and microfibers are formed from the polymer, which deposit themselves in a very uniform random arrangement on the support material. The resulting mat is characterized by the fact that the labyrinth-like pores enclosed by the fibers have a very uniform and narrow pore size distribution.

Since the depositing of the fibers on the support material takes place in an electrostatic opposing field, the fibers are deposited in a relatively loose condition, and the embedding of fiber into fiber, which would be equivalent to a reduction of the achievable pore volume, is to a great extent prevented.

The result can be controlled to a great extent by varying the conditions of the procedure, for example by varying the throughput, the temperature, the concentration of the solution, or by varying the spacing of the electrodes from one another. In general it is desirable to adjust the process so that all of the solvent will have evaporated from the polymer before the fibers reach the support material. The fibers have a substantially dumbbell-shaped cross section, and their greatest width should be between 0.05 and 20 $\mu$m, ranging preferably between 1 and 10 $\mu$m. Their denier ranges from about 0.00004 dtex to 3.7 dtex, preferably about 0.01 dtex to 1 dtex. The individual fibers may range in length from a few mm up to almost continuous, especially from about 25 to 200 mm.

In place of a solution of fiber-forming polymer, melt spinning techniques can be employed using a suitable spinning electrode, the spun fiber collected and formed into a web in known manner. Similarly wet spinning techniques can be employed.

Due to the dumbbell-shaped cross section of the microfibers forming the mat, it is possible to a great extent to reduce this uniform, loose fiber structure to a specific pore radius without collapsing the pore volume essential to its function.

The separator of the invention, even at a thickness of about 0.05 to 0.3 mm, a weight of about 20 to 100 g/m$^2$, a pore volume of about 50 to 90%, preferably about 60 to 80% and an average pore size of about 0.5 to 15 $\mu$m and preferably about 1 to 10 $\mu$m, has excellent mechanical, electrical and chemical properties. Making it thicker will not, in general, result in any substantial improvement in its practical characteristics. For special applications, in which, for example, a thicker construction must be used for secondary reasons, it is anticipated that the separator material of the invention can be laminated together with a relatively open-pored web of a sintered polymer, a woven fabric, a laid fabric, or a mat of electrolyte-resistant fibers. If thermoplastic materials are used in this case, the possibility will exist of welding the separator by known methods and thus simplifying its fabrication.

The advantages achieved with the separator of the invention consist especially in the fact that it consists of only one, precisely defined polymer whose nature can be matched to the stresses to which it will be subjected by the electrolyte and oxidation. It is chemically neutral, and is distinguished by good flexibility. Especially important is the fact that the desired labyrinth structure is provided by the randomly deposited fibers, and that the pore size can be controlled very precisely by compressing the material more or less greatly according to the fiber diameter and density of packing.

EXAMPLES

EXAMPLE 1

Microfibers were prepared from a 12% solution of polycarbonate in dichloromethane by the electrodynamic spray method, and deposited on a nonwoven web support band moving continuously past the spray electrode. The spraying field amounted to 4 kV/cm at a temperature of 25° C. with 30% relative humidity in the spray chamber. The web of material thus prepared was compressed in a separate procedure and had a pore radius distribution of 7 $\mu$m to 16 $\mu$m with a maximum at 10 $\mu$m. The ion passage resistance was 0.1 $\Omega/cm^2$. The pore volume was determined to be 80%. The thickness prior to compression was 2 mm and after was 0.3 mm.

EXAMPLE 2

The separator material from Example 1 was compressed without support material, down to a pore radius distribution of 1.6 $\mu$m to 7 $\mu$m with a maximum at 2 $\mu$m. The ion passage resistance amounted to 0.2 $\Omega/cm^2$. The pore volume was determined to be 65%. The thickness was 0.2 mm.

It will be appreciated that the instant specification and examples are set forth by way of illustration and not limitation, and that various modifications and changes may be made without departing from the spirit and scope of the present invention.

What is claimed is:

1. In a storage battery comprising a housing, a plurality of plates within said housing, an electrolyte within said housing about said plates, and a non-woven fabric separator between adjacent plates, the improvement which comprises employing as said separator a compressed web of synthetic fibers deposited in random arrangement and having an essentially dumbbell-shaped profile.

2. A storage battery according to claim 1, wherein the fibers have a maximum diameter of about 0.05 to 20 $\mu$m.

3. A storage battery according to claim 1, wherein the fibers comprise polystyrene, polyolefin or polycarbonate and have a maximum diameter of about 1 to 10 $\mu$m and the web has a thickness of about 0.05 to 0.3 mm, a weight of about 20 to 100 g/m$^2$, a pore volume of about 50 to 90% and an average pore size from about 0.5 to 15 $\mu$m.

* * * * *